US009510658B2

(12) United States Patent
Nagao

(10) Patent No.: US 9,510,658 B2
(45) Date of Patent: Dec. 6, 2016

(54) NAIL PRINTING APPARATUS, A CONTROLLING METHOD OF THE NAIL PRINTING APPARATUS AND A COMPUTER READABLE STORAGE MEDIUM

(71) Applicant: CASIO COMPUTER CO., LTD., Shibuya-ku, Tokyo (JP)

(72) Inventor: Tomoyuki Nagao, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/860,557

(22) Filed: Sep. 21, 2015

(65) Prior Publication Data

US 2016/0088918 A1     Mar. 31, 2016

(30) Foreign Application Priority Data

Sep. 26, 2014   (JP) .................................. 2014-196265

(51) Int. Cl.
| | | |
|---|---|---|
| *G06K 15/00* | (2006.01) | |
| *A45D 29/00* | (2006.01) | |
| *G06K 9/00* | (2006.01) | |
| *H04N 5/225* | (2006.01) | |

(52) U.S. Cl.
CPC ........... *A45D 29/00* (2013.01); *G06K 9/00362* (2013.01); *H04N 5/225* (2013.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 5,931,166 | A * | 8/1999 | Weber | A45D 34/04 132/200 |
| 6,286,517 | B1 * | 9/2001 | Weber | A45D 29/00 132/200 |
| 6,336,694 | B1 * | 1/2002 | Ishizaka | A45D 29/00 347/105 |
| 9,357,825 | B2 * | 6/2016 | Yamasaki | A45D 29/00 |
| 2011/0150293 | A1 * | 6/2011 | Bower | G06K 9/00006 382/117 |
| 2011/0160576 | A1 * | 6/2011 | Bower | A61B 5/0062 600/425 |

(Continued)

FOREIGN PATENT DOCUMENTS

JP         2012146182 A        8/2012

*Primary Examiner* — Ted Barnes
(74) *Attorney, Agent, or Firm* — Holtz, Holtz & Volek PC

(57) ABSTRACT

A nail printing apparatus is provided with a controlling unit for acquiring an end position on a tip side of a nail of a finger based on image data of an image of the finger, wherein the finger includes the nail having a nail tip portion and a nail back portion whose color is darker than a color of the nail tip portion. The controlling unit acquires luminance difference values which are difference in two of luminance values adjacent to each other in the image data, acquires a reference position where the luminance difference values represent a extreme value corresponding to a difference value between color of the nail tip portion and the nail back portion, and acquires the end position of the nail based on a position where the luminance difference values represent extreme value on the tip side from the reference position.

20 Claims, 10 Drawing Sheets

(56) References Cited

U.S. PATENT DOCUMENTS

| | | | |
|---|---|---|---|
| 2011/0216953 A1* | 9/2011 | Callahan | G06K 9/00 382/128 |
| 2011/0222740 A1* | 9/2011 | Kitane | A61B 5/6838 382/115 |
| 2012/0103210 A1* | 5/2012 | Hashimoto | B41J 3/407 101/35 |
| 2012/0274683 A1* | 11/2012 | Yamasaki | B41J 3/4073 347/2 |
| 2013/0038647 A1* | 2/2013 | Hashimoto | A45D 29/00 347/2 |
| 2013/0038648 A1* | 2/2013 | Kasahara | B41J 3/407 347/2 |
| 2014/0063084 A1* | 3/2014 | Yamasaki | B41J 3/4073 347/3 |
| 2014/0267517 A1* | 9/2014 | Yamasaki | B41J 3/4073 347/101 |
| 2014/0341459 A1* | 11/2014 | Bower | A61B 5/0062 382/131 |
| 2015/0007841 A1* | 1/2015 | Yamasaki | A45D 29/00 132/73.5 |

\* cited by examiner

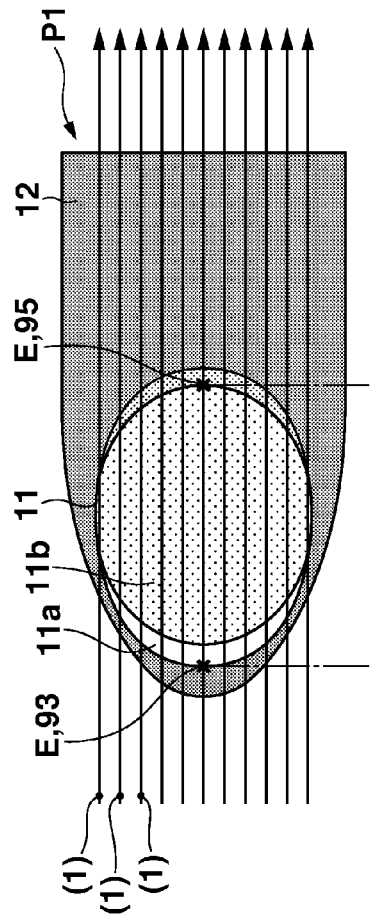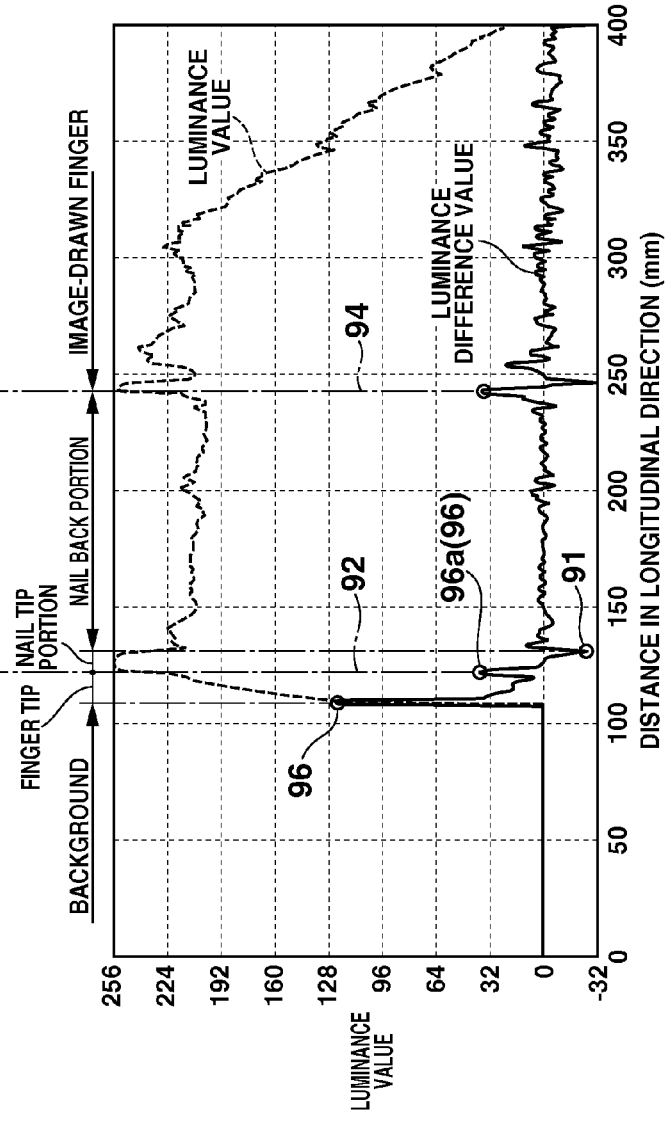
FIG.9A
FIG.9B

NAIL PRINTING APPARATUS, A CONTROLLING METHOD OF THE NAIL PRINTING APPARATUS AND A COMPUTER READABLE STORAGE MEDIUM

CROSS-REFERENCE TO RELATED APPLICATION

The present application is based upon and claims the benefit of priority from the prior Japanese Patent Application No. 2014-196265, filed Sep. 26, 2014, the entire contents of which are incorporated herein by reference.

BACKGROUND OF THE INVENTION

1. Field of the Invention

The present invention relates to a nail printing apparatus, a controlling method of the nail printing apparatus and a computer readable storage medium with an executable program stored thereon, for precisely extracting a nail region of a nail of a finger or toe of a user where a nail design is to be printed.

2. Description of the Related Art

A nail printing apparatus has been proposed, which holds a finger of a user on its finger placing stand to print a nail design on the nail of the finger.

To define a printing region to print a nail design therein, it is necessary for the nail printing apparatus to detect the region of the nail (nail region) of the finger. A method of detecting the nail region of the finger is known, in which a camera is used to image the finger on which a nail design is to be drawn to acquire an image of the finger, and the nail region of the finger is detected from the acquired finger image.

For instance, Japanese Unexamined Patent Publication No. 2012-146182 discloses a so-called Watershed method used as the method of detecting a nail region of the finger. The "watershed method" is one of the methods of segmenting a region, in which a luminance gradient of an image is supposed to be a peak of a mountain and each place into which water flows from the peak of the mountain is segmented as one region. In the method disclosed in Japanese Unexamined Patent Publication No. 2012-146182, the place of the highest luminance is set as the starting point of a nail region and a region including the starting point is detected by using Watershed method, whereby the nail region is extracted from the image.

In general, when a finger of a human is imaged, the front portion growing from the nail floor side of the finger is higher in luminance than other portion and seems somewhat white. Therefore, even if Watershed method is used to detect the nail region of a finger, it is difficult to extract the front portion of the nail.

BRIEF SUMMARY OF THE INVENTION

The present invention provides a nail printing apparatus, a controlling method of the nail printing apparatus, and a non-transitory computer readable storage medium with an executable program stored thereon, for precisely extracting a nail region where a nail design is to be printed.

According to one aspect of the invention, there is provided a nail printing apparatus which comprises a controlling unit which acquires a first end position of a nail of an object which is a finger or a toe on a tip side in a longitudinal direction of the object, the nail having a nail tip portion and a nail back portion whose color is darker than a color of the nail tip portion, wherein the controlling unit acquires image data of an image of the object, the image data having plural luminance values of plural pixels arranged in the longitudinal direction, the plural luminance values being arranged in order of positions of the plural pixels, acquires luminance difference values which are differences in two of the luminance values adjacent to each other in the image data, detects a reference position in the image data where the luminance difference values represent a first extreme value which corresponds to a difference value between the luminance value of the pixel disposed at the nail tip portion and the luminance value of the pixel disposed at the nail back portion, detects a first position in the image data where the luminance difference values represent a second extreme value different to the first extreme value on the tip side from the reference position, and acquires a position in the object in the longitudinal direction corresponding to the first position as the first end position.

According to another aspect of the invention, there is provided a controlling method of a nail printing apparatus, which comprises a step of acquiring image data of an image of an object which is a finger or toe having a nail, the nail has a nail tip portion and a nail back portion whose color is darker than a color of the nail tip portion, the image data have plural luminance values of plural pixels arranged in the longitudinal direction, the plural luminance values being arranged in order of positions of the plural pixels, a step of acquiring a luminance difference values which are difference values in two of the luminance values adjacent to each other in the image data, a step of detecting a reference position in the image data where the luminance difference value represent a first extreme value which corresponds to a difference value between the luminance values of the pixel disposed at the nail tip portion and a luminance value of the pixel disposed at the nail back portion, a step of detecting a first position in the image data where the luminance difference values represent a second extreme value different to the first extreme value on the tip side from the reference position, and a step of acquiring a position in the object in the longitudinal direction corresponding to the first position as the first end position.

According to other aspect of the invention, there is provided a non-transitory computer readable storage medium with an executable program stored thereon, wherein the storage medium is mounted on a nail printing apparatus provided with a computer, and the executable program, when installed on the computer, makes the computer execute functions of acquiring image data of an image of an object which is a finger or toe having a nail, the nail having a nail tip portion and a nail back portion whose color is darker than a color of the nail tip portion, the image data having plural luminance values of plural pixels arranged in the longitudinal direction, the plural luminance values being arranged in order of positions of the plural pixels; acquiring a luminance difference values which are difference values in two of the luminance values adjacent to each other in the image data; detecting a reference position in the image data where the luminance difference values represent a first extreme value corresponding to a difference value between the luminance value of the pixel disposed at the nail tip portion and the luminance value of the pixel disposed at the nail back portion; detecting first position in the image data where the luminance difference values represent a second extreme value different to the first extreme value on the tip side from the reference position; and acquiring a position in the object in the longitudinal direction corresponding to the first position as the first end position.

BRIEF DESCRIPTION OF THE SEVERAL VIEWS OF THE DRAWING

FIG. 9A is a plan view showing the acquired image "P1".

FIG. 9B is a graph showing an example of luminance values and luminance difference values taken in the longitudinal direction of an image-drawn finger, which corresponds to the acquired image P1 shown in FIG. 9A.

DETAILED DESCRIPTION OF THE PREFERRED EMBODIMENTS

The embodiments of the invention will be described with reference to the accompanying drawings in detail. Throughout the description of the embodiments of the invention, like elements will be denoted by like numerals. Further in the following description, when a user confronts a nail printing apparatus to use the same, a term of "front" means the near side of the nail printing apparatus and a term of "back" means the rear side of the nail printing apparatus. Similarly, a term of "left" means the left side of the nail printing apparatus and a term of "right" means the right side of the nail printing apparatus.

In the embodiments of the invention, the nail printing apparatus will be described as a printer used for drawing an image on the surface of a nail of a finger. The nail printing apparatus can be used not only for drawing an image on the nail of a finger but also for drawing an image on the nail of a toe.

Figure 1:
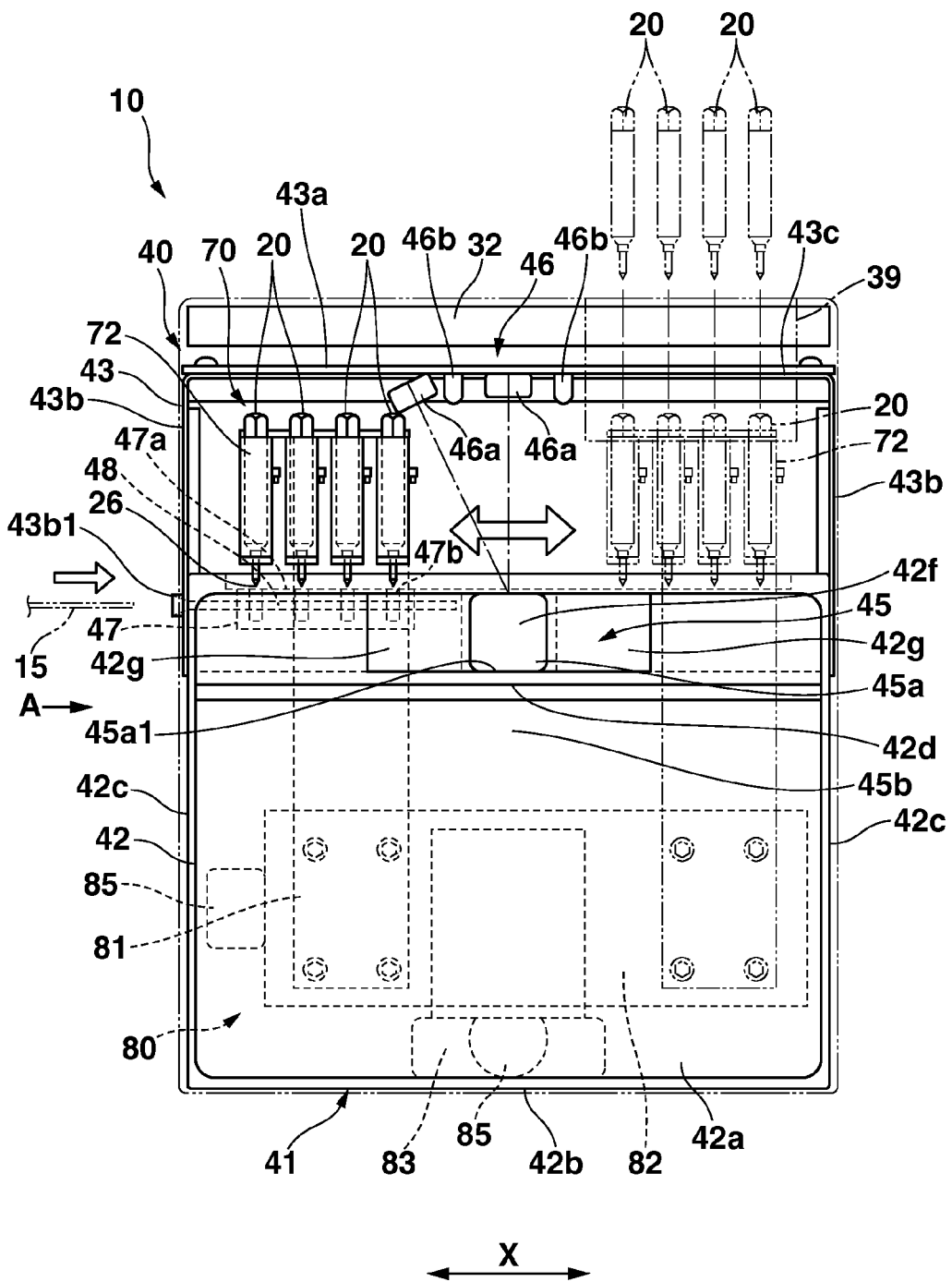
FIG. 1 is a front view of a nail printing apparatus according to the embodiments of the invention.
Figure 2:
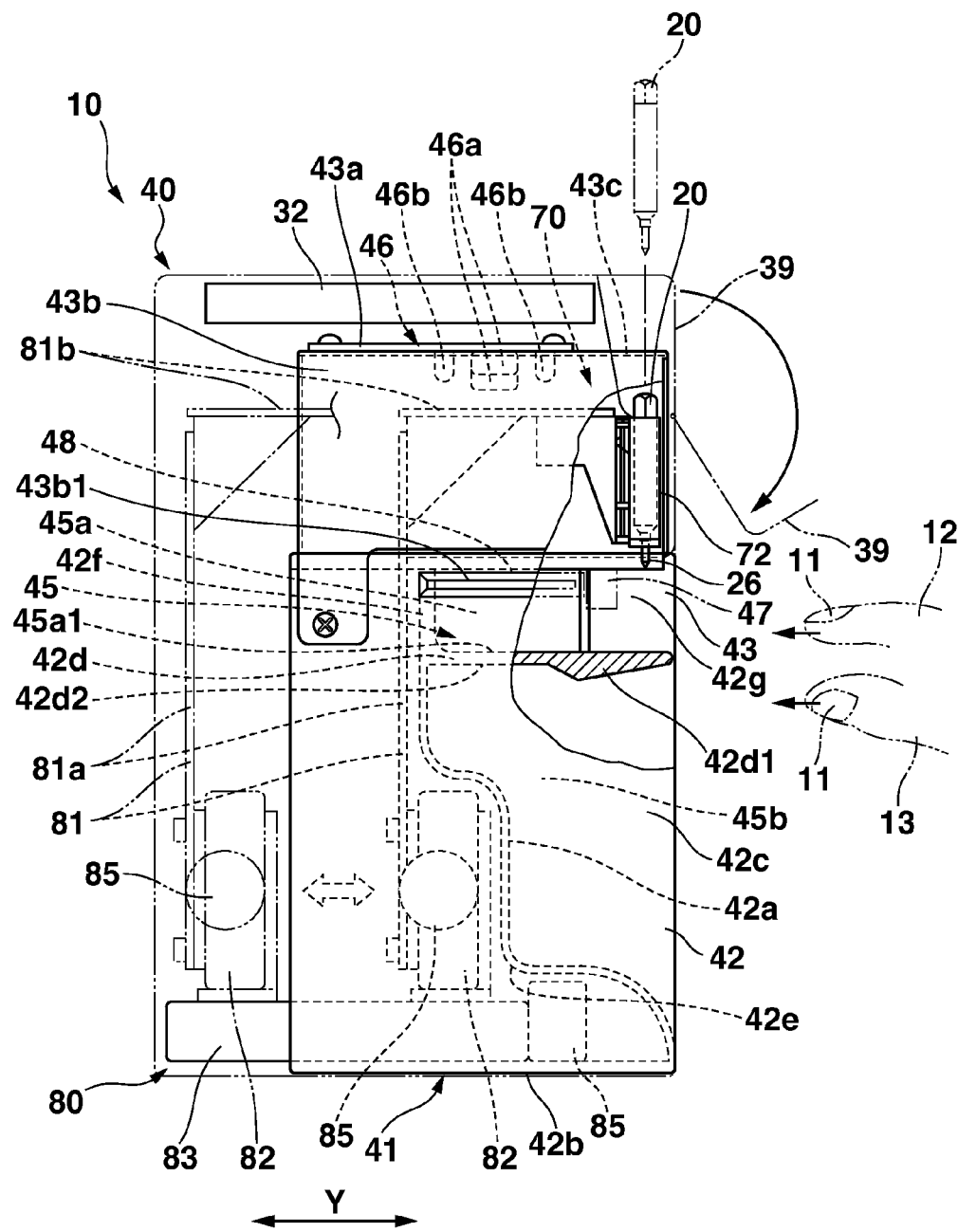
FIG. 2 is a partial cross-sectional side view of the nail printing apparatus, as seen in the direction indicated by an arrow "A" in FIG. 1, showing the internal construction of the nail printing apparatus.
Figure 3:
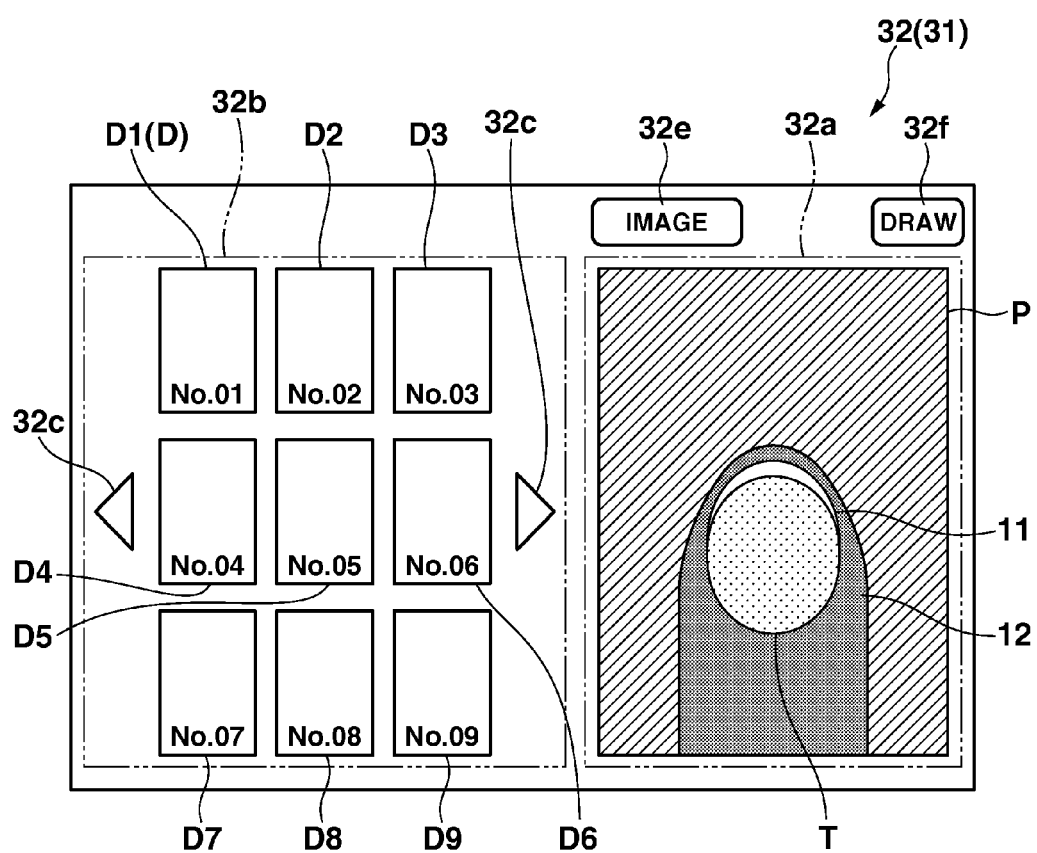
FIG. 3 is a plan view showing a displaying unit seen from above of the nail printing apparatus.

A circuit configuration of the nail printing apparatus according to the embodiments of the invention will described with reference to FIG. 1 to FIG. 3. FIG. 1 is a front view of the nail printing apparatus according to the embodiment of the invention. FIG. 2 is a partial cross-sectional side view of the nail printing apparatus, as seen in the direction indicated by an arrow "A" in FIG. 1, showing the internal construction of the nail printing apparatus. FIG. 3 is a plan view showing a displaying unit seen from above of the nail printing apparatus.

As shown in FIG. 1 and FIG. 2, the nail printing apparatus 10 is a plotter of a pen type, used to draw a design image on the nail 11 of the finger of the user. The nail printing apparatus 10 consists of a case body 40 and a device body 41 accommodated in the case body 40. In FIG. 1 and FIG. 2, the case body 40 is indicated by a two-dot line.

The case body 40 is provided with a cover 39 on its one side (the right side in this embodiment). The cover 39 is opened for replacing a pen(s).

The case body 40 is provided with a displaying unit 32 on its top surface. For the displaying unit 32, various sorts of flat display devices such as a liquid crystal displaying device and/or an organic electro-luminescence displaying device are used. The displaying unit 32 is of a touch panel type, having a function of an operation unit 31. For example, touching on the surface of the displaying unit 32 with his/her finger, or using a stylus pen and/or a pointed writing pen, the user can enter an instruction through the touch panel. A further detailed construction of the displaying unit 32 will be described later.

As shown in FIG. 1, the device body 41 is formed substantially in a box shape, and has a lower machine frame 42 mounted on the front lower-part of the case body 40 and an upper machine frame 43 mounted on the front upper-part of the case body 40 and fixed to the lower machine frame 42.

The device body 41 is provided with a finger fixing unit 45 and a imaging unit (image acquiring unit) 46. Further, the device body 41 is provided with an image drawing unit 70 including pens 20, a moving unit 80 for moving the image drawing unit 70 in the leftward and/or rightward directions and in the frontward and/or rearward directions, a cap unit 47 for protecting the points 26 of the pens 20, a trial writing unit 48 for using the pens 20 on a trial basis, and a controlling device 51 (Refer to FIG. 4) for controlling operations of these units. The arbitrary number of pens 20 can be used in the image drawing unit 70, but the nail printing apparatus 10 prepared with 4 pens will be described in the present embodiment of the invention.

The upper machine frame 43 is composed of a base plate 43a and a pair of upper left and right side plates 43b, 43b. The base plate 43a is provided along the beneath surface of the displaying unit 32.

The upper machine frame 43 is made with an opening 43c facing the cover 39 for replacing the pen 20.

When the pen 20 is installed or replaced, the cover 39 is opened and the pen 20 can be installed into or removed from a pen holder 72 through the opening 43c with the image drawing unit 70 moved to the right end.

In practical use, when the operation unit 31 and the touch panel are operated by the user in accordance with an instruction displayed on the displaying unit 32 to select a design image, it is instructed, what color of pens 20 should be selected and to which pen holders 72 they should be installed. For example, it is instructed that "the pen 20 of No. 2" should be installed in "the pen holder 72 of No. 1".

As shown in FIG. 2, the lower machine frame 42 is composed of a rear plate 42a, a bottom plate 42b, a pair of lower left and right side plates 42c, 42c, and a separation wall 42d. The lower ends of the lower side plates 42c, 42c are connected to the left and right ends of the bottom plate 42b, respectively.

The rear plate 42a is connected to the bottom plate 42b and the lower side plates 42c, 42c so as to cover the back side of a space surrounded by the bottom plate 42b and the lower side plates 42c, 42c.

The rear plate 42a is formed in a stepwise form (42e). The separation wall 42d is provided horizontally within the lower machine frame 42 so as to vertically separate the space 45 (which is defined by the rear plate 42a, the bottom plate 42b and the lower side plates 42c, 42c.) into an upper and a lower spaces 45a, 45b. Both side ends of the separation wall 42d are fixed to the lower side plates 42c, 42c, and the rear end of the separation wall 42d is fixed to the rear plate 42a.

The lower machine frame 42 is integrally provided with a finger fixing unit 45.

The finger fixing unit 45 has a finger receiving unit 45a and a finger rest-space 45b, both separated by the separation wall 42d.

The finger receiving unit 45a is prepared above the separation wall 42d and disposed substantially in a central part in the lateral direction of the lower machine frame 42.

The finger receiving unit 45a receives a finger (hereinafter, referred to as the "image-drawn finger") 12, on whose nail 11 a design image is to be drawn. Meanwhile, the finger rest-space 45b is provided beneath the separation wall 42d, where the fingers 13 other than the image-drawn finger 12 are allowed to retract.

The finger receiving unit 45a has openings both at the front side and the upper side of the lower machine frame 42 respectively.

The separation wall 42d provides a finger placing portion 45a1 beneath the finger receiving unit 45a.

A front wall 42f is provided so as to stand on the front end of the separation wall 42d to cover the front side of the lower machine frame 42.

Further, there are provided a pair of guide walls 42g, 42g on the upper surface of the separation wall 42, the width between which guide walls 42g, 42g becomes gradually narrower from the front wall 42f toward the finger receiving unit 45a.

When the user inserts his/her finger into the printing apparatus 10, the pair of guide walls 42g, 42g guides the image-drawn finger 12 to the finger receiving unit 45a.

When the user inserts the fingers into the finger fixing unit 45, he/she is allowed to hold the separation wall 42d with his/her image-drawn finger 12 inserted into the finger receiving unit 45a and other fingers 13 put in the finger rest-space 45b, whereby his/her image-drawn finger 12 is steadily held in the finger receiving unit 45a.

Further, the separation wall 42d is formed with a projection or bulge 42d1 at its front bottom surface.

In the present embodiment, the top surface of the separation wall 42d is flat. Meanwhile, the beneath surface of the separation wall 42d goes slim from the top of the projection 42d1 to the front end (the right end in FIG. 2) and as a result, a recess 42d2 is formed in the rear side of the projection 42d1.

The projection 42d1 and the recess 42d2 formed in the separation wall 42 secure a space between the finger nail 11, on which a design image has been drawn, and the top surface of the recess 42d2, when the fingers 13 other than the image-drawn finger 12 are inserted into the finger rest-space 45b. As a result, this space prevents the finger nail 11, on which a design image has been drawn, from touching the separation wall 42d and holds the ink drawn on the nail separate from the apparatus, whereby the design image drawn on the nail 11 is kept safe from chafing.

As shown in FIG. 1, the image acquiring unit 46 is mounted substantially at the center of the undersurface of the base plate 43a.

The image acquiring unit 46 is provided with a camera 46a and a lighting lamp 46b. In the present embodiment, plural cameras (for example, two cameras) 46a, 46a and plural lighting lamps (for example, four lamps) 46b, 46b are provided.

The cameras 46a, 46a, each having about 200 million pixels or more, are provided to image the image-drawn finger 12 inserted into the finger receiving unit 45a and its nail 11.

The plural lighting lamps 46b, 46b are disposed so as to surround the cameras 46a, 46a to light up the nail 11 of the image-drawn finger 12. White color LED can be effectively used as the lighting lamps 46b, 46b.

In the image acquiring unit 46, at least one of the plural cameras 46a, 46a is disposed directly above the finger receiving unit 45a such that the camera 46a images the nail 11 from right above, and at least one of the plural cameras 46a, 46a is disposed on the upper side out of directly above the finger receiving unit 45 such that the camera 46a images the nail 11 from obliquely above. Imaging the nail 11 from directly above and obliquely above by the cameras 46a, 46a, the curvature of the nail 11 can be calculated more accurately, and a design image can be drawn on the curved nail 11 more appropriately.

As shown in FIG. 1 and FIG. 2, the moving unit 80 is provided with an X stage 82 and a Y stage 83. The X stage 82 moves a carriage 81 supporting the image drawing unit 70 in the leftward and/or rightward directions as indicated by an arrow "X" in FIG. 1 and the Y stage 83 moves the carriage 81 in the frontward and/or rearward directions as indicated by an arrow "Y" in FIG. 2.

The X stage 82 and the Y stage 83 each consist of a driving unit 85 including a stepping motor, a ball screw feeding mechanism, and guides.

The driving unit 85 can use any driving means for moving the image drawing unit 70 such as a servo-motor other than the stepping motor.

The X stage 82 and the Y stage 83 can be a mechanism composed of shafts, guides, and wires other than a combination of the stepping motor, ball screw feeding mechanism, and guides.

The carriage 81 is composed of a lower carriage 81a extending upward from the X stage 82 and an upper carriage 81b extending frontward from the upper edge of the lower carriage 81a. The image drawing unit 70 is fixed to the front end of the upper carriage 81b of the carriage 81.

In the nail printing apparatus 10, the moving unit arbitrarily moves the carriage 81 in the Y- and X-directions, thereby moving the pen 20 of the image drawing unit 70 to an arbitrary position in the Y- and X-directions to draw a desired design on the nail 11.

As shown in FIG. 1, the cap unit 47 is disposed on the left or the right side of the finger receiving unit 45a (on the left side of the finger receiving unit 45a in the present embodiment).

The cap unit 47 has a cap body 47a and insertion holes 47b formed in the top of the cap body 47a. The insertion holes 47b receive the points 26 of the pens 20 from the upper side.

When the nail printing apparatus 10 is not in operation, the image drawing unit 70 is moved to above the cap unit 47 to allow the points 26 of the pens 20 to insert in the insertion holes 47b, whereby the points 26 of the pens 20 are prevented form getting dry when the pens 20 are not in use.

The number of insertion holes 47b can be arbitrarily determined depending on the number of pens 20 of the image drawing unit 70. In the present embodiment, four insertion holes 47b are prepared in a line so as to meet the number of pens 20.

A flat portion disposed behind the cap unit 47 is used as the trial writing unit 48.

The upper side plate 43b (on the left side of the case body 40 in the present embodiment) is prepared with an insertion opening 43b1.

A medium 15 on which an image is to be drawn is inserted onto the trial writing unit 48 through the insertion opening 43b1. Any medium can be used as the medium 15, if the medium such as paper allows the point 26 of the pen 20 to draw an image thereon for the purpose of trial.

In the nail printing apparatus 10, the trial writing unit 48 is brought downward to touch the medium 15 with the point 26 of the pen 20 and draws a prescribed image such as "○" and "∞" on the medium 15 on a trial basis before drawing a design image on the nail 11, thereby preventing failure in drawing an image in the beginning due to a dry point of the pen 20.

In this way, a design image can be drawn on the nail 11 with the point 26 of the pen in good condition. The prescribed image is not restricted to the special image but any image will do, such as "○" and "∞" which is simple in shape, requiring a little ink to draw.

It is preferable to draw a trail image (prescribed image) on a little different position on the medium 15 every time the trial drawing is performed by the trial writing unit 48. When the trial images have been drawn all on the entire surface of the medium. 15, a notice of "Please, replace paper" is displayed on the displaying unit 32, prompting the user to replace the medium.

As shown in FIG. 3, a design confirming unit 32a is provided on one side of the displaying unit 32, on which unit 32a the user can confirm an image (hereinafter, the "acquired image" P) of the image-drawn finger 12 imaged with the camera 46a, and a region (hereinafter, the "nail region" T) of the nail 11 in the acquired image "P". Next to the design confirming unit 32a, there is provided a design selection unit 32b, on which plural nail designs D1, D2, D3, . . . are displayed. In the following description, the plural nail designs are generally referred to as the "nail design (s)" D.

By touching a nail design "D" displayed on the design selection unit 32b, the user can select the nail design "D" as to be drawn on the nail 11 out of the plural nail designs "D" displayed on the design selection unit 32b. Two triangular buttons 32c, 32c are prepared on the design confirming unit 32a on both sides thereof, and when the triangular button 32c is pressed, another nail designs "D" are displayed in place of the nail designs "D" which have been displayed thereon.

Further, an image obtaining button "IMAGE" 32e for acquiring an acquired image "P" and a drawing button "DRAW" 32f for drawing the selected nail design "D" on the nail 11 are prepared on the displaying unit 32.

Figure 4:
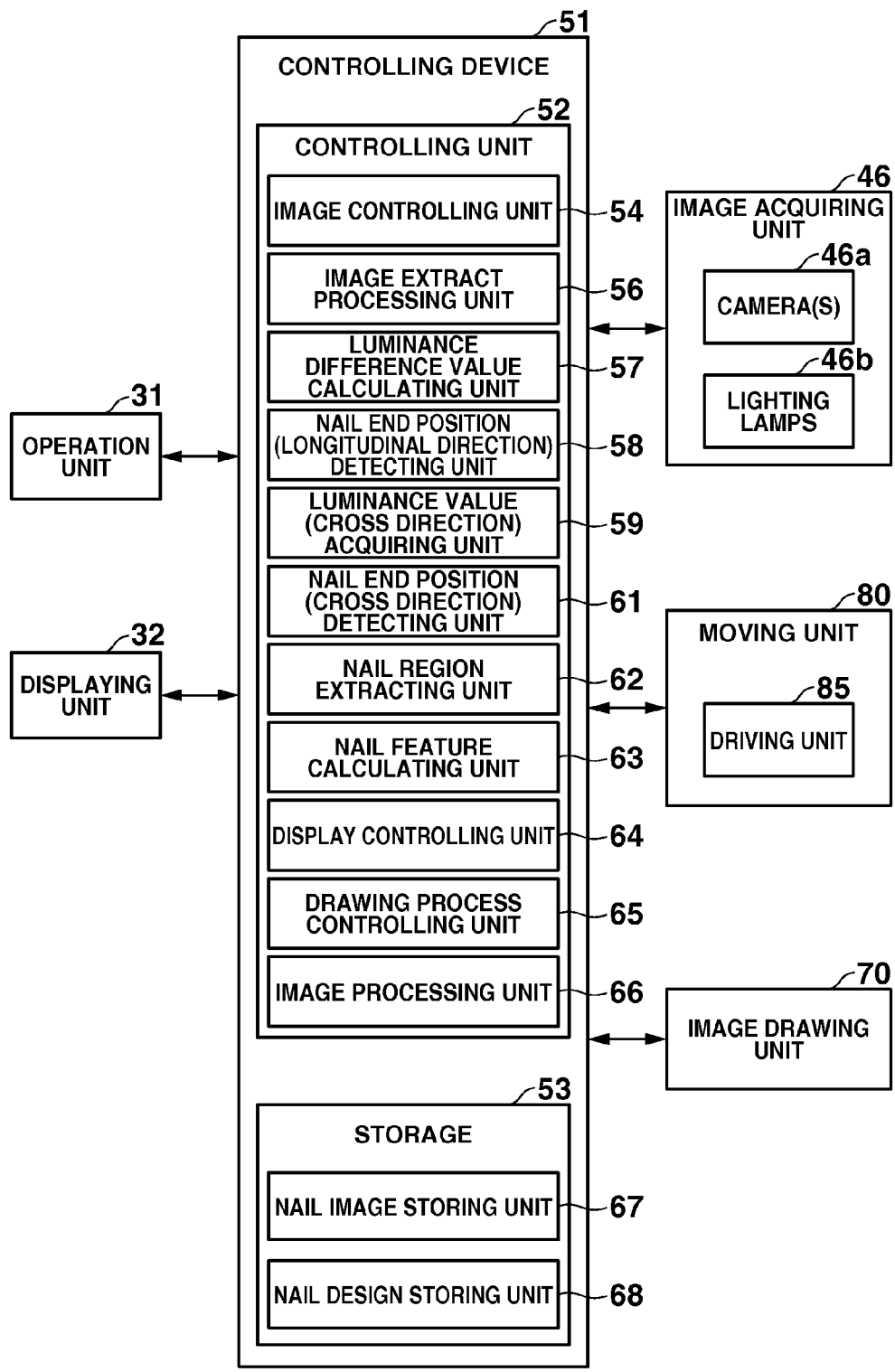
FIG. 4 is a block diagram showing a circuit configuration of the nail printing apparatus according to the embodiments of the invention.

FIG. 4 is a block diagram showing a circuit configuration of a controlling unit of the nail printing apparatus 10 according to the embodiment of the invention. As shown in FIG. 4, the controlling device 51 consists of a controlling unit 52 including CPU (Central Processing Unit) and a storage unit 53 including ROM (Read Only Memory) and RAM (Random Access Memory).

The controlling unit 52 comprises an image controlling unit 54, an image extract processing unit 56, a luminance difference value calculating unit 57, a nail end position (longitudinal direction) detecting unit 58, a luminance value (cross direction) acquiring unit 59, a nail end position (cross direction) detecting unit 61, a nail region extracting unit 62, a nail feature calculating unit 63, a display controlling unit 64, a drawing process controlling unit 65, and an image processing unit 66.

The functions of these units are realized when a program stored in ROM of the storage 53 is executed by CPU of the controlling unit 52.

The image controlling unit 54 controls the camera 46a and the lighting lamps 46b of the image acquiring unit 46 to image the image-drawn finger 12 inserted into the finger receiving unit 45a, thereby acquiring an acquired-image "P".

Figure 5:
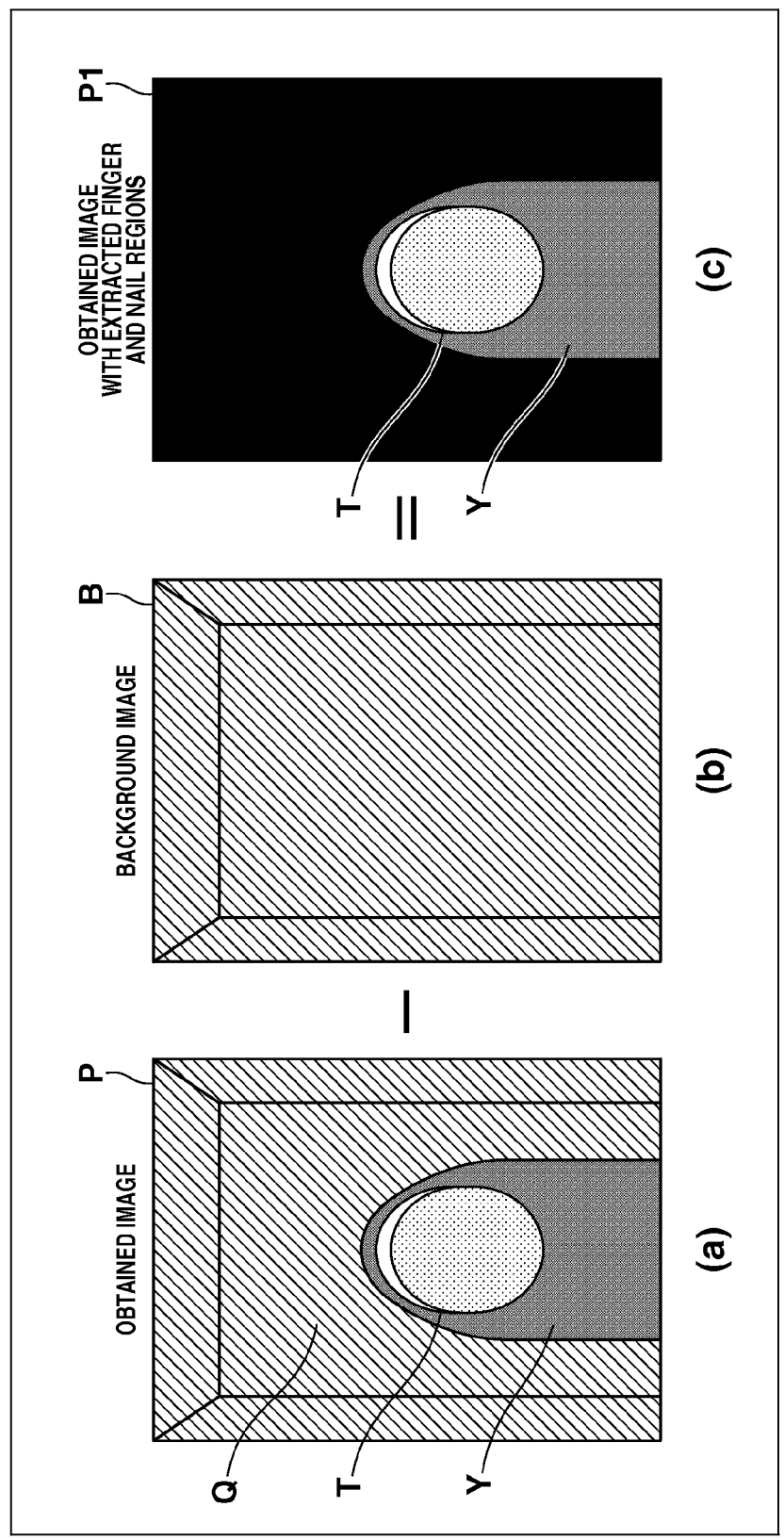
FIG. 5 is a view for explaining a process of extracting regions (a finger region and a nail region), performed by the nail printing apparatus. (A) of FIG. 5 is a view showing an acquired image "P". (B) of FIG. 5 is a view showing a background image. (C) of FIG. 5 is a view showing an acquired image "P1" which has been extracted from the acquired image "P".

FIG. 5 is view for explaining a process performed by the image extract processing unit 56 to extract a region (hereinafter, the "finger region" Y) of the finger and a nail region "T" from the acquired image "P".

As shown in (a) of FIG. 5, the acquired image "P" contains three regions: a background region "Q" corresponding to the inside of the finger receiving unit 45a, the finger region "Y" and the nail region "T".

The image extract processing unit 56 extracts the finger region "Y" and the nail region "T" from the acquired image "P", and paints the background of the finger region "Y" in black, as shown in (c) of FIG. 5.

For the image extract processing unit 56 to perform the image clipping process, only the background is imaged with the camera 46a and image data (hereinafter, the image data of the "background image" B) of the background is prepared previously, as shown in (b) of FIG. 5.

Plural pixel data of the image data of the acquired image "P" are compared with corresponding pixel data of the image data of the background image B and regions which are greatly different in color are extracted as the finger region "Y" and the nail region "T". The acquired image "P" and the background image "B" are composed of plural pixels disposed in matrix, and the plural pixel data of the above image data to be compared are also disposed in matrix.

More specifically, supposing that RGB gradations of the image data of the acquired image "P" are expressed by Ra, Ga, and Ba, and RGB gradations of the image data of the background image B are expressed by Rb, Gb and Bb, and a threshold value is T, the following numerical expression (1) is used to extract the finger region "Y" and the nail region "T" from the acquired image "P":

$$(Ra-Rb)^2+(Ga-Gb)^2+(Ba-Bb)^2>T \quad (1)$$

That is, it is determined that the regions where the numerical expression (1) is satisfied are the finger region "Y" and the nail region "T".

On the contrary, it is determined that the region where the numerical expression (1) is not satisfied indicates the background region and the RGB gradations of all the pixels in the background region are made "0" and the background region is printed in black. An image (hereinafter, the "acquired image" P1) with the extracted finger region "Y" and nail region "T" will be shown in (c) of FIG. 5.

The luminance difference value calculating unit 57 (shown in FIG. 4) calculates difference values in luminance values between two adjacent pixel data in the acquired image "P1" along the longitudinal direction of the image-drawn finger 12 to acquire luminance difference value.

The nail end position (longitudinal direction) detecting unit 58 detects the position of the end of the nail 11 in the longitudinal direction of the nail 11 based on the luminance difference values. The detail will be described later.

The luminance value (cross direction) acquiring unit 59 acquires luminance values in the cross direction of the image-drawn finger 12 from the image data of the acquired image "P1".

The nail end position (cross direction) detecting unit 61 detects the positions of the both ends of the image-drawn finger 12 in the cross direction from the luminance values. The detail will be described later.

The nail region extracting unit 62 extracts a region (nail region) "T" of the nail based on the positions of the ends of the nail 11 detected by the nail end position (longitudinal direction) detecting unit 58 and the positions of the drawing finger detected by the nail end position (cross direction) detecting unit 61.

To calculate a luminance value, "NTSC Coefficients method" is used. In "NTSC Coefficient method", the sum of weighted gradation values of R (red), G (green) and B (blue) of pixel data is divided by 3 to acquire an average value (of grey), where the weighting coefficients (NTSC Coefficients) are the same as those used in the luminance signal separation in the general TV broadcasting system.

Supposing that the gradation values of R (red), G (green) and B (blue) are given by arbitrary integers from 0 to 255, the luminance value "Y" (grey scale: an integer from 0 to 255) will be expressed by the following formula:

$$Y=0.3R+0.59G+0.11B$$

In the present embodiment, the value of "Y" is used as the luminance value. The method of calculating the luminance value is not restricted to the above, but any method can be used to calculate the luminance value.

The functions of the luminance difference value calculating unit 57, the nail end position (longitudinal direction) detecting unit 58, the luminance value (cross direction) acquiring unit 59, the nail end position (cross direction) detecting unit 61, and the nail region extracting unit 62 will be described in the description of a method of detecting the nail region "T" in detail.

The nail feature calculating unit 63 detects feature amounts of the nail 11.

Figure 6:
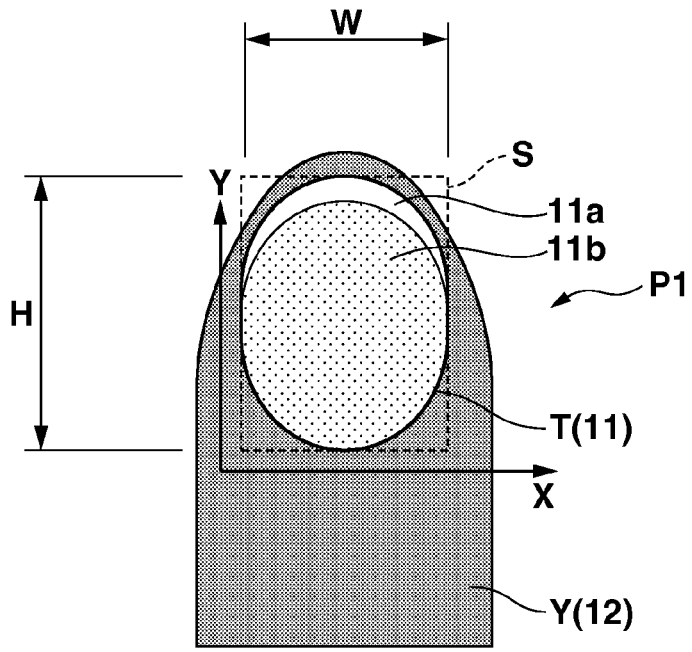
FIG. 6 is a plan view of the acquired image "P1" for explaining the feature amounts of the nail.

FIG. 6 is a plan view of the acquired image "P1" for explaining the feature amounts of the nail 11.

The feature amounts expressing the nail 11 contain, for example, an area of the nail region "T" and an area ratio "R" of the area of the nail region "T" to the area of a circumscribed rectangle "S" that is just outside and touching the nail 11 along the longitudinal direction of the nail 11.

These feature amounts of the nail 11 can be acquired by setting that the maximum length of the nail 11 in the longitudinal direction of the image-drawn finger 12 is "Ti", and the maximum width of the nail 11 in the cross direction crossing the longitudinal direction of the image-drawn finger 12 at right angles is "W", as shown in FIG. 6.

The area of the nail region "T" can be calculated based on the number of pixels falling in the nail region "T".

More specifically, supposing that X-axis is set in the width direction of the nail 11 and Y-axis is in the longitudinal direction of the image-drawn finger 12, the length "H" of the nail 11 will be given by [the maximum Y coordinate value of the nail region "T"–the minimum Y coordinate value of the nail region "T"].

The width "W" of the nail 11 will be given by [the maximum X coordinate value of the nail region "T"–the minimum X coordinate value of the nail region "T"].

The area ratio "R" will be acquired by calculating [the area of the nail region "T"/(the length "H" of the nail 11×the width "W" of the nail 11)]. The area ratio R is a similarity measure for the nail region "T" to the rectangle "S".

The display controlling unit 64 (shown in FIG. 4) controls the displaying unit 32 to display various screens thereon.

For example, the display controlling unit 64 displays on the displaying unit 32 various sorts of display screens such as the design selection unit 32b, the design confirming unit 32a, the acquired image "P" and the nail region "T", and various sorts of buttons such as the image obtaining button 32e and the drawing button 32f.

The drawing process controlling unit 65 outputs image-drawing data generated by the image processing unit 66 to the moving device 80 and the image drawing unit 70, thereby controlling operation of the driving unit 85 of the moving device 80 and the image drawing unit 70 to draw an image on the nail 11 with the pen 20 in accordance with the image-drawing data.

The image processing unit 66 enlarges or reduces in size a nail design "D" selected by the user in accordance with the size of the nail region "T" in the acquired image "P1" to generate image-drawing data.

Various sorts of programs and data required for operating the nail printing apparatus 10 are stored in ROM of the storage unit 53. The controlling device 51 executes these programs to control the whole operation of the units of the nail printing apparatus 10.

There are prepared in the storage unit 53 a nail image storing unit 67 for storing the nail region "T" of the user acquired by the image acquiring unit 46 and a nail design storing unit 68 for storing plural nail designs "D".

Operation of Embodiments

Figure 7:
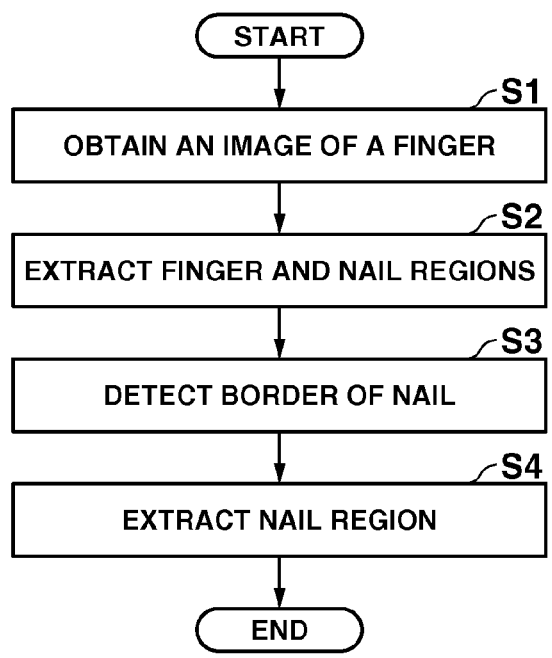
FIG. 7 is a flow chart of operation of the nail printing apparatus according to the embodiments of the invention.
Figure 8:
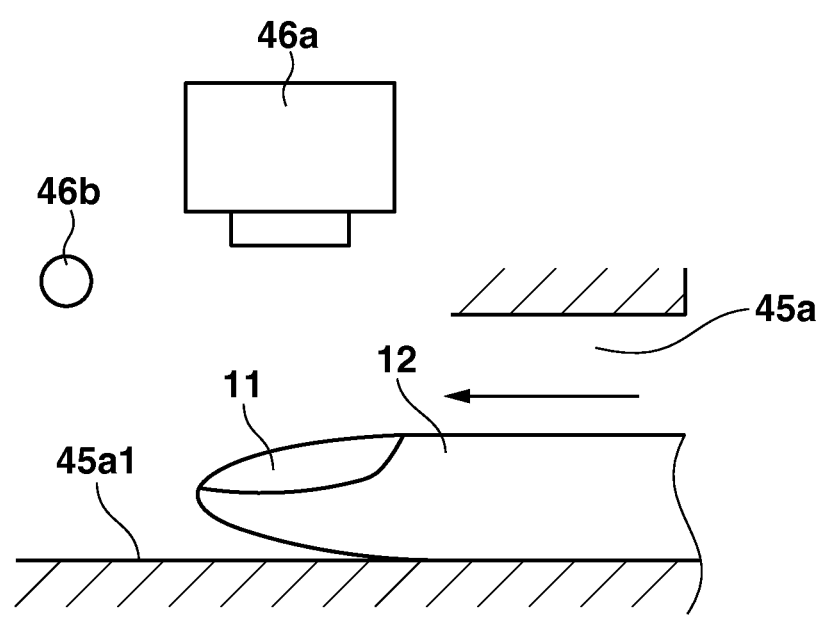
FIG. 8 is a cross section view schematically showing the vicinity of the finger receiving unit of the nail printing apparatus according to the embodiments of the invention.
Figure 10A:
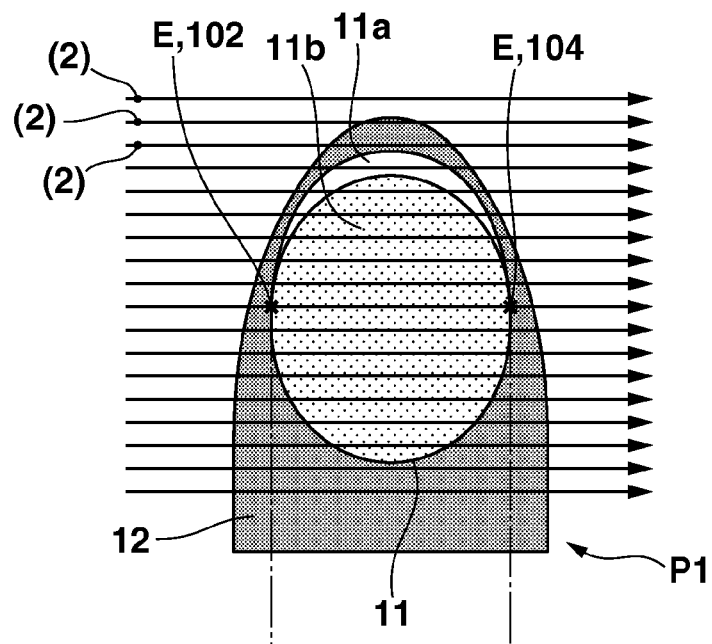
FIG. 10A is a plan view showing the acquired image "P1".
Figure 10B:
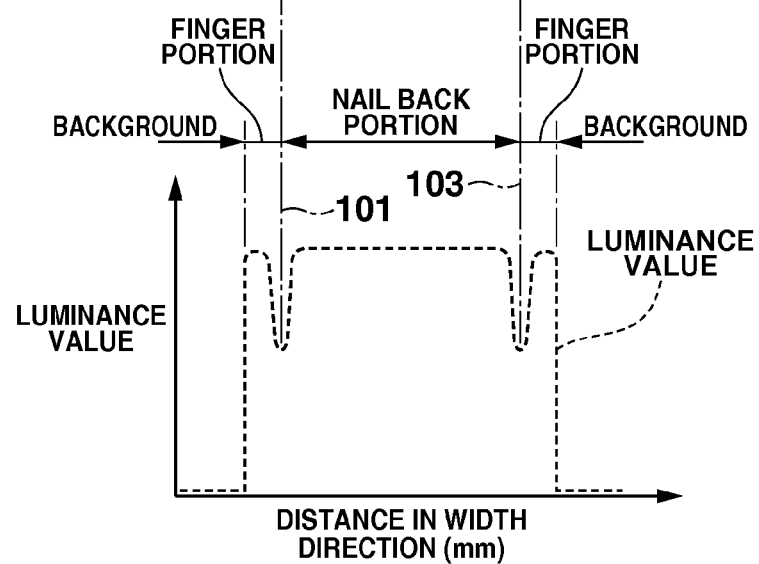
FIG. 10B is a graph showing an example of luminance values taken in the cross direction of the drawing finger, which correspond to the acquired image "P1" shown in FIG. 10A.
Figure 11:
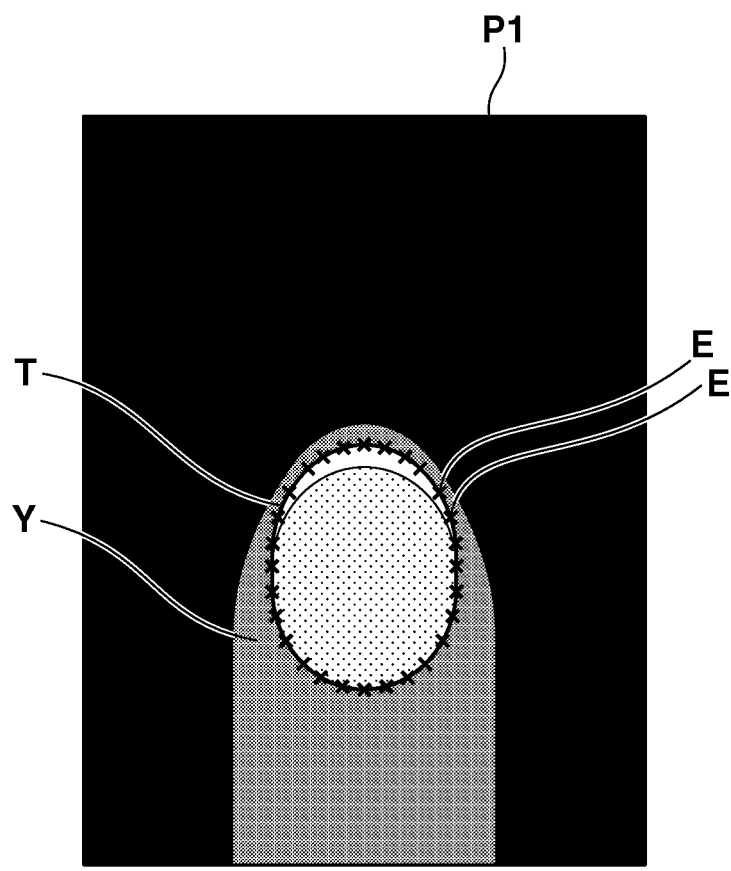
FIG. 11 is a plan view showing the acquired image "P1", for explaining an extracted nail region of the finger.

The method of detecting the nail region "T" in the nail printing apparatus 10 will be described with reference to FIG. 7 to FIG. 11. The method of detecting the nail region "T" corresponds to a method of controlling the operation of the nail printing apparatus 10. FIG. 7 is a flow chart of the operation of the nail printing apparatus 10. FIG. 8 is a cross section view schematically showing the vicinity of the finger receiving unit 45a. FIG. 9A is a plan view showing the acquired image "P1". FIG. 9B is a graph showing an example of luminance values and luminance difference values taken in the longitudinal direction of the image-drawn finger, which corresponds to the acquired image "P1" shown in FIG. 9A. FIG. 10A is a plan view showing the acquired image "P1". FIG. 10B is a graph showing an example of luminance values taken in the cross direction of the image-drawn finger, which correspond to the acquired image "P1" shown in FIG. 10A. FIG. 11 is a plan view showing the acquired image "P1", for explaining the extracted nail region.

The operation of the nail printing apparatus 10 will be described with reference to the flow chart of FIG. 7. The user presses the image obtaining button 32e displayed on the displaying unit 32 (step S1).

More specifically, the user presses the image obtaining button 32e with his/her one hand with the image-drawn finger 12 of the other hand inserted into the finger receiving unit 45a and held therein, as shown in FIG. 8.

Then, the image-drawn finger 12 including the nail 11 is imaged with the camera 46a and image data of the acquired image "P" including the nail 11 is acquired (acquiring image data step).

The finger region "Y" and the nail region "T" are extracted from the acquired image "P", whereby the acquired image "P1" is acquired (step S2) (Refer to (c) of FIG. 5).

A process of detecting a border "E" defining the nail 11 from the acquired image P1 is performed (step S3). The border "E" of the nail 11 is a portion where the pixel data value is changed greatly.

The process of detecting the border "E" of the nail 11 (the process at step S3) will be described with reference to FIG. 9A and FIG. 9B in detail. In FIG. 9A, the acquired image "P1" is displayed with the background printed in black omitted (similar in FIG. 10A).

The luminance difference value calculating unit 57 acquires the luminance values and luminance difference values representing luminance difference values of the pixel data between two adjacent pixels in the longitudinal direction of the image-drawn finger 12, as shown in FIG. 9A and FIG. 9B.

The luminance difference value calculating unit 57 scans the acquired image "P1" in the directions as indicated by plural arrows (1), (1), (1) . . . shown in FIG. 9A plural times, thereby acquiring plural pieces of luminance difference values each representing a luminance difference values in the longitudinal direction of the image-drawn finger 12 (luminance difference value acquiring step).

The luminance difference value is a difference value in luminance values between two pixels adjacent in the direction indicated by the arrow (1), and can be calculated by subtracting a luminance value of the luminance value of the second pixel from a luminance value of the first pixel, wherein the first pixel comes first and the second pixel comes next in the direction indicated by the arrow (1) in FIG. 9A.

FIG. 9B is a view showing a graph of the values taken substantially at the center in the cross direction of the image-drawn finger 12 among the plural pieces of luminance values and luminance difference values, wherein the horizontal axis of the graph indicates a distance measured from the end indicated by the image-drawn finger 12 in the acquired image "P1" and the vertical axis indicates a luminance value given by [0.3R+0.59G+0.11B].

In the graph, the luminance values are indicated by a broken line and the luminance difference values are indicated by a solid line.

The luminance difference values of a solid line are given by V(x)–V(x–1), where V(x) represents luminance values at a position "x" from the end indicated by the image-drawn finger 12.

As shown in FIG. 9B, it will be understood that the luminance value changes greatly at four points indicated by round marks in the graph of the luminance values.

In other words, the luminance value changes greatly at the following points (borders):
(1) at the border between the background and the image-drawn finger 12 (the local maximum value of the luminance difference values: a positive value);
(2) at the border between the image-drawn finger 12 and the tip of the nail (nail tip portion 11a) (the local maximum value of the luminance difference values a positive value);
(3) at the border between the nail tip portion 11a and the nail 11 other than the nail tip portion 11a (hereinafter, the "nail back portion 11b") (the local minimum value of the luminance difference values: a negative value); and
(4) at the border between the nail back portion 11b and the image-drawn finger 12 (the local maximum value of the luminance difference values: a positive value).

When paying attention to the sign of the value of the luminance difference values at the four borders, it will be understood that the value of the luminance difference value has the negative sign only at the border between the nail tip portion 11a and the nail back portion 11b.

The phenomena that the value of the luminance difference values has the negative sign at the border between the nail tip portion 11a and the nail back portion 11b occurs not only in the case of the nail 11 described as an example, but in general, occurs in the case of the finger whose the nail tip portion 11a is separated from the nail bed and is seen somewhat white, having a larger luminance value than the nail back portion 11b and the image-drawn finger 12.

The border (4) corresponds to a border between the cuticle on the nail and nail back portion 11b on the root side of the nail 11. In general, the cuticle on the nail has a higher luminance value than the nail back portion 11b, and is seen white.

In the present invention, attention is paid to the feature or the negative peak 91 in FIG. 9B, and edges "E" corresponding to both ends of the nail 11 in the longitudinal direction are detected on the basis of the position of the negative peak 91 as the front end 93 of the nail 11 and the root end 95 of the nail 11 respectively. The front end 93 and the root end 95 of the nail 11 are indicated by "x" in FIG. 9A.

More particularly, on the basis of the negative peak 91 of the luminance difference values on the side of the very front end of the image-drawn finger 12, the nail end position (longitudinal direction) detecting unit 58 detects the position 92 of the maximum value 96a of luminance difference values on the side indicated by the image-drawn finger 12 to acquire the position 93 of the front end of the nail 11.

Further, on the basis of the negative peak 91 of the luminance difference values, the nail end position (longitudinal direction) detecting unit 58 detects the position 94 of the maximum value of luminance difference values on the side opposite to the side indicated by the image-drawn finger 12 to acquire the position 95 of the root (root end) of the nail 11.

In the case where there are two maximum values 96, 96a of the luminance difference values on the side indicated by the image-drawn finger 12 on the basis of the negative peak 91 as viewed in FIG. 9B, the nail end position (longitudinal direction) detecting unit 58 acquires the second appearing maximum value 96a from the very front end of the image-drawn finger 12, which is closest position to the negative peak 91, as the position 93 of the front end of the nail 11.

The example of the image-drawn finger 12 with the nail 11 not growing longer than the image-drawn finger 12 (Refer to FIG. 9A) has been described in the foregoing description. In the case of the image-drawn finger 12 with the nail 11 growing longer than the image-drawn finger 12, since the background is painted in black, the luminance difference value at the border between the black painted background and the nail tip portion 11a will be positive.

In this case, there appears one maximum value of the luminance difference values on the side of the front end of the image-drawn finger 12 on the basis of the negative peak 91. The nail end position (longitudinal direction) detecting unit 58 acquires the position 93 of the front end of the nail 11 based on this maximum value of the luminance difference values.

In other words, since one or two maximum values appear in the luminance difference values on the side indicated by the image-drawn finger 12 on the basis of the negative peak 91 depending the condition of nail growing, the nail end position (longitudinal direction) detecting unit 58 acquires the second appearing maximum value 96*a* toward the root end of the nail 11 as the position 93 of the front end of the nail 11 in the case of two maximum values, and acquires the maximum value as the position 93 of the front end of the nail 11 in the case of one maximum value.

The luminance value (cross direction) acquiring unit 59 scans the acquired image "P1" in the directions indicated by arrows (2) shown in FIG. 10A to acquire luminance values (cross-direction luminance values) taken in the cross direction of the image-drawn finger 12, as shown in FIG. 10A and FIG. 10B (step S3 in FIG. 7). Scanning the acquired image P1 in the directions indicated by the plural arrows (2), the luminance value (cross direction) acquiring unit 59 acquires plural pieces of luminance values each taken in the cross direction of the image-drawn finger 12.

FIG. 10B is a view showing a graph of the cross-direction luminance values taken substantially at the center in the longitudinal direction of the image-drawn finger 12 among the plural pieces of luminance values, the graph representing a variation (luminance value) of the cross-direction luminance values measured along the cross direction from one side to the other side of the image-drawn finger 12, wherein the horizontal axis of the graph indicates a distance measured in the cross direction from one side end of the image-drawn finger 12 in the acquired image "P1" and the vertical axis indicates a luminance value.

From the graph of the cross-direction luminance values shown in FIG. 10B, it will be understood that there are two minimum values of the luminance values at the both sides 101, 103 (borders between the nail 11 and finger 12), which substantially correspond to the both sides of the nail 11.

The nail end position (cross direction) detecting unit 61 detects a position 101 of the minimum value of the cross-direction luminance values on one side of the center of the image-drawn finger 12 in its cross direction to acquire the edge "E" (left end 102) of the nail 11.

Further, the nail end position (cross direction) detecting unit 61 detects a position 103 of the minimum value of the cross-direction luminance values on the other side of the center of the image-drawn finger 12 in the cross direction to acquire the other edge "E" (right end 104) of the nail 11. The left end 102 and right end 104 of the nail 11 in the cross direction are indicated by "x" in FIG. 10A.

In the process at step S3, plural sets of the position 93 of the front end of the nail 11 and the position 95 of the root end of the nail 11 are acquired in the cross direction of the image-drawn finger 12, and plural sets of the position of the left end 102 of the nail 11 and the position of the right end 102 of the nail 11 are acquired in the longitudinal direction of the image-drawn finger 12.

These acquired positions 93, 95, 102, 104 correspond to the edges "E" of the nail 11, and are painted, for instance, in black (Refer to FIG. 11).

The nail region extracting unit 62 uses the edges "E" detected at step S3 to extract the nail region "T" from the acquired image P1 (step S4), whereby the finger region "Y" and the nail region "T" are separated by the edges "E" as shown in FIG. 11.

When a number of edges "E" are connected as illustrated in FIG. 11, a region surrounded by the connected edges "E" will be the nail region "T".

Sometimes plural regions other than the nail region "T" can be detected due to noises. When plural regions have been detected, it is possible to select the nail region "T" from among the plural regions by calculating an area (the number of pixels) of a region and an area ratio "R" of the region to judge if the calculated area and area ratio of the region satisfy the feature amounts (area and area ratio) of the nail 11.

More specifically, in general, actual nails have an area from 30 mm$^2$ to 2400 mm$^2$ and most of the nails have the area falling into a range from 30 mm$^2$ to 2400 mm$^{2'}$ Therefore, it can be determined that a region among the plural regions, having the area falling into a range from 30 mm$^2$ to 2400 mm$^2$ is the nail region "T".

Further, in general, actual nails have the area ratio "R" of not less than 60% and most of the nails have the area ratio "R" of less than 60%. Therefore, it can be determined that a region among the plural regions, having the area ratio R' of not less than 60% is the nail region "T". For more accurate determination, it is possible to determine that the region whose area (the number of pixels) and area ratio "R" fall into the above range is the nail region "T".

The operation of the nail printing apparatus 10, described above, can be performed, when a program is executed by computer to realize at least the following functions:

(1) a function of making the camera acquires the acquired image "P";

(2) a function of making the luminance difference value calculating unit 57 acquires plural pieces of luminance difference values, the plural pieces of luminance difference values being disposed in parallel in the cross direction of the image-drawn finger 12;

(3) a function of making the nail end position (longitudinal direction) detecting unit 58 acquires the position 93 of the front end of the nail 11 on the side indicated by the image-drawn finger 12 on the basis of the negative peak 91 of the luminance difference values on the side of the very front end of the image-drawn finger 12 and acquires the position 94 of the maximum value as the position 95 of the root end of the nail 11 on the side closer to the root end of the nail 11 than the negative peak 91 on the basis of the negative peak 91 of the luminance difference values; and (4) a function of performing the function (3) on every luminance difference values.

The program ("program of controlling operation of the nail printing apparatus") is stored in ROM of the storage 53.

As described in the foregoing detailed description the nail printing apparatus 10 is provided, which can precisely extract the whole nail region "T" from the nail 11 of the image-drawn finger 12 on which the nail design "D" is to be drawn, and a method of controlling operation of the nail printing apparatus 10, and a computer program of controlling operation of the nail printing apparatus 10 are provided.

The present invention has been described with the reference to the specific embodiments, it will be understood that the invention is not limited to the particular embodiments described herein.

In the present embodiment, to separate the finger region "Y" from the acquired image "P", the background is printed in black as illustrated in (c) of FIG. 5, but it will be possible to previously prepare the inside (imaging area) of the finger receiving unit 45*a* in black such that when the acquired image "P" is acquired, the background "Q" of the image "P" will be black. Consequently, there is no need to prepare the background image "B" ((b) of FIG. 5) and the process of printing the background "Q" in black can be omitted.

This process of printing the background "Q" in black is performed such that difference value in luminance values between the background "Q" and the finger 12 and/or the nail 11 is made large, and therefore, color to print the background "Q" is not limited to "black" but any color will do. If the background "Q" is printed in such color and the difference value in luminance values is definite, such color will be acceptable.

Although specific configurations of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. A nail printing apparatus comprising:
a controlling unit which acquires a first end position of a nail of an object which is a finger or a toe on a tip side in a longitudinal direction of the object, the nail having a nail tip portion and a nail back portion whose color is darker than a color of the nail tip portion, wherein
the controlling unit acquires image data of an image of the object, the image data having plural luminance values of plural pixels arranged in the longitudinal direction, the plural luminance values being arranged in order of positions of the plural pixels,
acquires luminance difference values which are differences in two of the luminance values adjacent to each other in the image data,
detects a reference position in the image data where the luminance difference values represent a first extreme value which corresponds to a difference value between the luminance value of a pixel disposed at the nail tip portion and the luminance value of a pixel disposed at the nail back portion, detects a first position in the image data where the luminance difference values represent a second extreme value different from the first extreme value on the tip side from the reference position, and acquires a position in the object in the longitudinal direction corresponding to the first position as the first end position.

2. The nail printing apparatus according to claim 1, wherein
the controlling unit acquires the first end positions respectively at plural different positions disposed in a width direction of the object.

3. The nail printing apparatus according to claim 1, wherein
the controlling unit uses the extreme value appearing at a position closest to the reference position as the second extreme value, when plural extreme values of the luminance difference values appear on the tip side from the reference position.

4. The nail printing apparatus according to claim 1, wherein
the controlling unit detects a second position in the image data where the luminance difference values represent a third extreme value on a root side of the object from the reference position, and acquires a position in the object in the longitudinal direction corresponding to the second position as the second end position.

5. The nail printing apparatus according to claim 4, wherein
the controlling unit acquires the second positions respectively at plural different positions disposed in a width direction of the object.

6. The nail printing apparatus according to claim 4, wherein the image data has plural luminance values of plural pixels arranged in a width direction of the object,
the controlling unit acquires width-direction luminance values which represent the luminance values of plural pixels disposed in the width direction of the object based on the image data; and
acquires a third end position of the nail in one side of the width direction of the nail, the third end position being a position where the width-direction luminance values represent the lowest luminance value in a range from a center to the one side of the object in the width direction; and
acquires a fourth position of the nail in the other side of the width direction of the nail, the fourth position being a position where the width-direction luminance values represent the lowest luminance value in a range from the center to the other side of the object in the width direction.

7. The nail printing apparatus according to claim 6, wherein
the controlling unit acquires the third positions and the fourth positions respectively at plural different positions disposed in the longitudinal direction of the object.

8. The nail printing apparatus according to claim 6, wherein
the controlling unit defines a whole region of the nail based on the first positions, the second positions, the third positions, and the fourth positions.

9. The nail printing apparatus according to claim 8, wherein
the controlling unit amends image data of a previously set design image so as to adjust to a configuration of the whole region of the nail, thereby generating image drawing data,
the nail printing apparatus further comprising an image drawing unit which draws an image on the nail in accordance with the image drawing data.

10. A controlling method of a nail printing apparatus, comprising:
a step of acquiring image data of an image of an object which is a finger or toe having a nail, the nail has a nail tip portion and a nail back portion whose color is darker than a color of the nail tip portion, the image data have plural luminance values of plural pixels arranged in the longitudinal direction, the plural luminance values being arranged in order of positions of the plural pixels;
a step of acquiring a luminance difference values which are difference values in two of the luminance values adjacent to each other in the image data;
a step of detecting a reference position in the image data where the luminance difference value represent a first extreme value which corresponds to a difference value between the luminance values of a pixel disposed at the nail tip portion and a luminance value of a pixel disposed at the nail back portion; a step of detecting a first position in the image data where the luminance difference values represent a second extreme value different from the first extreme value on the tip side from the reference position; and a step of acquiring a position in the object in the longitudinal direction corresponding to the first position as the first end position.

11. The controlling method of a nail printing apparatus, according to claim 10, wherein the first end positions are acquired respectively at plural different positions disposed in a width direction of the object, at the first end position acquiring step.

12. The controlling method of a nail printing apparatus, according to claim 10, wherein
when plural extreme values of the luminance difference values appear on the tip side from the reference position, the extreme value appearing at a position closest to the reference position is used as the second extreme value, at the first position acquiring step.

13. The controlling method of a nail printing apparatus, according to claim 10, further comprising:
a step of acquiring second end position which detects a second position in the image data where the luminance difference values represent a third extreme value on a root side of the object from the reference position, and acquires a position in the object in the longitudinal direction corresponding to the second position as the second end position.

14. The controlling method of a nail printing apparatus, according to claim 13, wherein
the second end positions are acquired respectively at plural different positions disposed in a width direction of the object, at the second end position acquiring step.

15. The controlling method of a nail printing apparatus, according to claim 13, further comprising:
a step of acquiring width-direction luminance values which represent the luminance values of the plural pixels disposed in the width direction of the object based on the image data having plural luminance values of plural pixels arranged in the width direction of the object;
a step of acquiring a third end position of the width direction of the nail, the third end position being a position where the width-direction luminance values represent the lowest luminance value in a range from a center to the one side of the object in the width direction; and
a step of acquiring a forth end position of the nail in the other side of the width direction of the nail, the fourth position being a position where the width-direction luminance value represent the lowest luminance value in a range from the center to the other side of the object in the width direction.

16. The controlling method of a nail printing apparatus, according to claim 15, further comprising:
a step of defining a whole region of the nail based on the first positions, the second positions, the third positions, and the fourth positions.

17. A non-transitory computer readable storage medium with an executable program stored thereon, wherein the storage medium is mounted on a nail printing apparatus provided with a computer, and the executable program, when installed on the computer, makes the computer execute functions of
acquiring image data of an image of an object which is a finger or toe having a nail, the nail having a nail tip portion and a nail back portion whose color is darker than a color of the nail tip portion, the image data having plural luminance values of plural pixels arranged in the longitudinal direction, the plural luminance values being arranged in order of positions of the plural pixels;
acquiring a luminance difference values which are difference values in two of the luminance values adjacent to each other in the image data;
detecting a reference position in the image data where the luminance difference values represent a first extreme value corresponding to a difference value between the luminance value of a pixel disposed at the nail tip portion and the luminance value of a pixel disposed at the nail back portion; detecting first position in the image data where the luminance difference values represent a second extreme value different from the first extreme value on the tip side from the reference position; and acquiring a position in the object in the longitudinal direction corresponding to the first position as the first end position.

18. The non-transitory computer readable storage medium with an executable program stored thereon, according to claim 17, wherein the executable program further makes the computer execute a function of
detecting a second position in the image data where the luminance difference values represent a third extreme value on the side of the object from the reference position; and
acquiring a position in the object in the longitudinal direction corresponding to the second position as the second end position.

19. The non-transitory computer readable storage medium with an executable program stored thereon, according to claim 18, wherein the executable program further makes the computer execute functions of
acquiring width-direction luminance values which represent the luminance values of the plural pixels disposed in a width direction of the object based on the image data having plural luminance values of plural pixels arranged in the width direction of the object;
acquiring a third end position of the width direction of the nail, the third end position being a position where the width-direction luminance values represent lowest luminance value in a range from a center to the one side of the object in the width direction; and
acquiring a forth end position of the nail in the other side of the width direction of the nail, the fourth position being a position where the width-direction luminance values represent the lowest luminance value in a range from the center to the other side of the object in the width direction.

20. The non-transitory computer readable storage medium with an executable program stored thereon, according to claim 19, wherein the executable program further makes the computer execute a function of
defining a configuration of a whole region of the nail based on the first positions, the second positions, the third positions, and the fourth positions.

* * * * *